UNITED STATES PATENT OFFICE.

FRANCIS J. OAKES AND SIDNEY O. DILLON, OF NEW YORK, N. Y.

DYEING PROCESS.

1,271,067. Specification of Letters Patent. Patented July 2, 1918.

No Drawing. Application filed July 2, 1915. Serial No. 37,672.

*To all whom it may concern:*

Be it known that we, FRANCIS J. OAKES and SIDNEY O. DILLON, citizens of the United States, residing at New York city, in the county of New York and State of New York, have invented new and useful Improvements in Dyeing Processes, of which the following is a specification.

Our invention consists in a new method of dyeing cotton and other vegetable fibers and is particularly applicable to the use of vegetable coloring materials which produce lakes.

Heretofore and before the introduction of the synthetic anilin dyes, which have practically monopolized the field, the bath for dyeing was composed of the vegetable coloring matter in combination with a suitable salt of a heavy metal in the presence of an alkali, but never so far as we are aware in presence of a free acid. The disadvantages were notorious, that is the coloring was imperfect and uneven, also bleeding and crocking, for apparently the color lake was deposited on the surface of the fiber and not truly combined therewith.

Then the synthetic anilin colors were discovered and developed, which were cheaper to make and to use and did not have the aforesaid disadvantages. Therefore they speedily displaced the vegetable coloring materials and these old alkaline processes for coloring vegetable fibers, and have held the field until the present time. But now the anilin dyes cannot be obtained on account of the war, for practically all such dyes have been made in Germany.

It therefore has become desirable to devise substitutes and we have invented the process here described, which has none of the said disadvantages of the alkaline processes, and is, not only the equal of the anilin dyes, but is superior thereto in certain important respects. The characteristic feature of our invention is the addition of a suitable acid to the dye bath.

Heretofore and before the time of the anilin dyes the following was the usual process for dyeing vegetable fiber: Taking, as an illustration, any suitable vegetable dye, for instance a mixture of logwood, copper sulfate and sodium carbonate (which when dry does not react) and thoroughly wetting the same, a chemical reaction is excited between the copper sulfate, or other salt of a heavy metal, and the sodium carbonate, or other suitable alkali, and there is thus produced a precipitate which absorbs the coloring matter present to form a lake.

This is the point at which the dyeing was done and still is done by the few who use logwood or similar vegetable coloring matters. That is, there is thus produced an imperfect solution which was used as the dye bath with the imperfect results above referred to.

But in our process we do not use the same as a dye bath, for we have discovered that by means of an acid we can make a perfect solution of the lake so formed, and then use such perfect solution as a dye bath with superior results.

Preferably the lake is dissolved in a suitable acid and in the presence of sodium sulfate or other suitable neutral salt, which, on account of ionization, more quickly causes the color to be deposited on the fiber. As a matter of course generally speaking the solution must be heated—for some shades to boiling, for others to a less degree of heat.

The result is to produce a perfect solution which combines with the fiber perfectly and evenly and we believe as aforesaid that the use of an acid for this purpose is broadly new. Therefore we do not propose to limit ourselves to any particular acid, but propose to cover the use of any suitable organic or inorganic acid,—the amount, of course, will vary but will always give an acid reaction. Acetic acid, gives good results, and, as an illustration of inorganic acids, we have obtained excellent results with hydrochloric acid, but with that, care must be taken not to use too much. The organic acids have the advantage generally of not destroying the color.

As for the neutral salt any suitable neutral salt may be used, for instance potassium sulfate or ammonium sulfate, but they cost more.

This process may be practised successfully by means of the acid alone, but superior results are obtained by using also the neutral salt, which quickens the process. The presence of an easily soluble salt, such as the sodium sulfate, increases the amount of coloring matter that will leave the bath and enter the fiber, because the increased number of sodium ions prevents the dissociation of the coloring matter, thus lessening its solubility.

This process of dyeing may be successfully conducted in a wooden vessel but a copper vessel gives better results with most solutions.

By our process we obtain all the advantages of the anilin dyes, and in addition add strength and weight to the fiber, which the anilin dyes do not.

It will be understood that the aforesaid mixture of logwood, copper sulfate and sodium carbonate is used merely as an illustration and that our process may be applied to the use of other dyes containing other coloring matters, other salts of a heavy metal and other alkalis, with or without an oxidizing agent.

Having described our invention we claim:

1. The herein described process for dyeing vegetable fibers which consists in first producing a lake by adding the coloring matter to a bath containing a salt of a heavy metal and an alkali, then dissolving the lake in an acid and then applying the same to a vegetable fiber.

2. The herein described process for dyeing cotton and other vegetable fibers which consists in first producing a lake by adding coloring matter to a bath containing a salt of a heavy metal and an alkali, then dissolving the lake in an acid in the presence of a neutral salt, then immersing the vegetable fiber to be dyed in the solution.

3. The herein described process for dyeing cotton fiber and fabric, which consists in first producing a lake by adding a vegetable coloring matter to a bath containing copper sulfate and sodium carbonate, then dissolving the lake in a hot solution containing acetic acid and sodium sulfate, in a copper vessel, and then immersing the cotton fiber to be dyed in the solution.

In testimony whereof we have signed our names to this specification in the presence of two subscribing witnesses.

FRANCIS J. OAKES.
SIDNEY O. DILLON.

Witnesses:
O. C. HALL,
D. A. CHRISTOFFERS.

Copies of this patent may be obtained for five cents each, by addressing the "Commissioner of Patents, Washington, D. C."